(No Model.)
J. REDELIGX.
MACHINE FOR MAKING ORNAMENTS FOR GILT CORNICES, &c.
No. 300,128. Patented June 10, 1884.
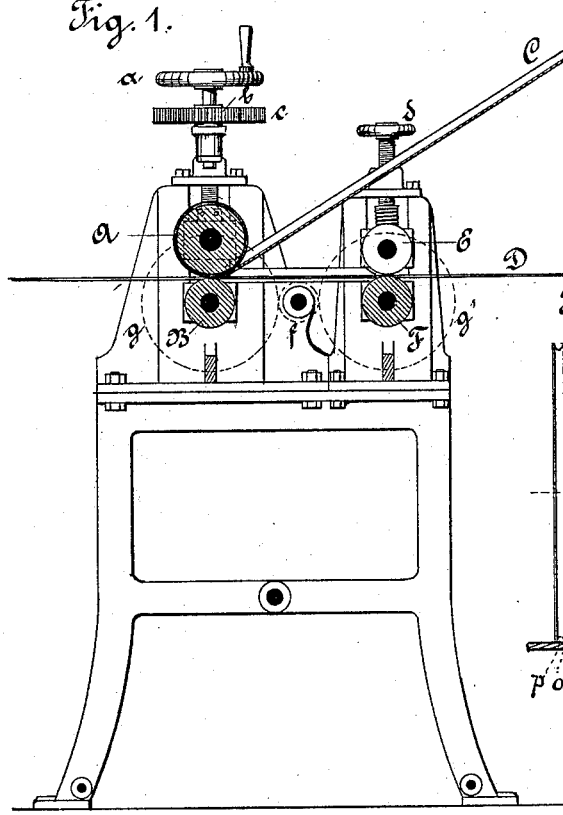
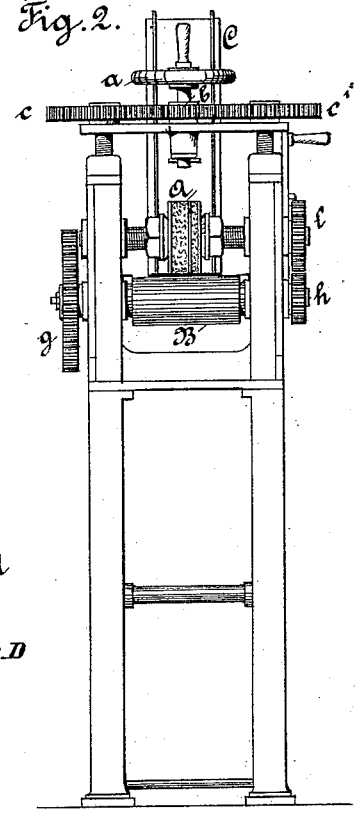
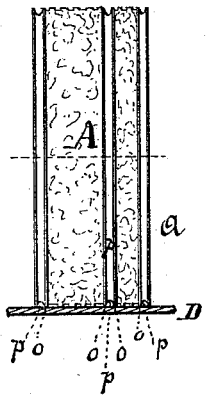
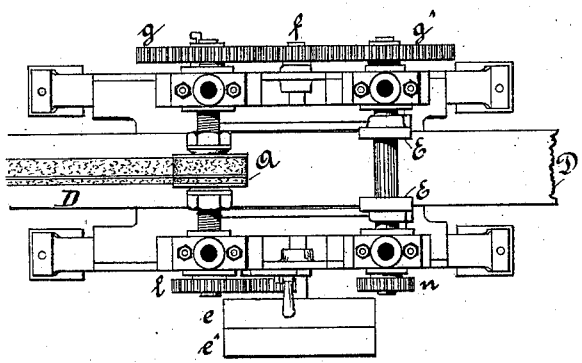
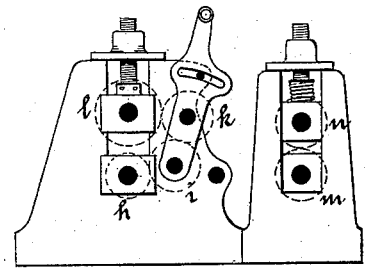
Witnesses:
John C. Tunbridge.
John M. Speer
Inventor:
Josef Redeligx
by his attorneys
Briesen & Steele

United States Patent Office.

JOSEF REDELIGX, OF COLOGNE-ON-THE-RHINE, GERMANY.

MACHINE FOR MAKING ORNAMENTS FOR GILT CORNICES, &c.

SPECIFICATION forming part of Letters Patent No. 300,128, dated June 10, 1884.

Application filed September 24, 1883. (No model.)

*To all whom it may concern:*

Be it known that I, JOSEF REDELIGX, a resident of Cologne-on-the-Rhine, Germany, have invented an Improved Machine for Making Ornaments for Gilt Cornices and the Like, of which the following is a specification, reference being made to the accompanying drawings, in which—

Figure 1 is a vertical central section of my improved machine for making ornaments for gilt cornices and the like. Fig. 2 is an end elevation of the same. Fig. 3 is a plan or top view of the same. Fig. 4 is a detailed vertical central section of the upper part of the same when the several pressure-rollers are taken off their axles; and Fig. 5 is a detailed edge view, on an enlarged scale, of the figuring-roller.

Ornaments for gilt cornices, heavy picture-frames, and the like are usually made of plastic matter, which in most cases is composed of linseed-oil and chalk.

Heretofore such ornaments have usually been molded in forms and produced in small sections, which had to be applied with care in their proper order to the surfaces which it was intended to decorate. Such a proceeding caused great labor and loss of time, and required considerable skill in the final disposition of the parts of the ornaments.

My invention has for its object to produce such ornaments of plastic material in continuous strips; and it consists more particularly in combining with the figuring-roller by which the plastic matter is shaped a traveling support for the latter, and means for feeding such traveling support along, all as hereinafter more fully described.

In the accompanying drawings, the letter A represents the figuring-roller—that is to say, a roller having its periphery carved or shaped inversely to the ornaments to be produced. This roller is mounted upon an axis which has its bearings in the framing of the machine.

B is the counter-roller to the figuring-roller A, and is substantially smooth, being preferably placed beneath the roller A, as it is shown in Fig. 1.

C is an inclined trough or conduit, on which the plastic substance slides down to the rollers A B, to which it is fed; or, instead of letting the plastic mass slide of its own accord to the rollers A B, it may be moved by suitable means from a mixing-machine on such a trough or conduit, C, to said rollers.

D is a traveling bed or support for the finished molding. Preferably it is a narrow sheet of sheet metal—such as zinc or brass—which, passing between rollers E and F, is fed by said rollers E F to the rollers A B, passing between the latter, so that the plastic matter which is pressed into form by the figured roller A will be deposited upon and fed along with this traveling sheet or bed D. It will be perceived thus that the plate D, by depending upon the rollers E and F for its necessary movement, determines to an extent, together with the roller A, the extent of progress of the finished molding or ornament, the roller B serving merely as a pressure-roller for crowding, with the assistance of the intermediate plate, D, the plastic matter into the cavities of the figured roller A.

Fig. 3 indicates at its left-hand portion how the decoration is deposited on the plate D. It is desirable at the same time that the molding or ornament is shaped on the traveling plate D by the figured roller A to cut or trim its edges, so that hand-trimming may not afterward be necessary; and to this end the roller A is made with cutting-edges *o* at its extremities, which, pressing on the plate D, will cut or trim off the ornament or molding that is being produced, there being on the roller A, outside of the cutting-edge *o*, a grooved portion, *p*, in which the excess of plastic matter is received, and by which said excess is formed into side strips, that are deposited on the plate D, detached from the main ornament. If desired, the roller A may have cutting-edges *o o* and intervening groove *p* within its body, as shown in Fig. 5, so as to produce two or more ornamented strips from the plastic material.

In operating the machine, whenever one plate, D, passes from beyond the grip of the rollers E F, another similar plate is immediately put in position to follow the first, &c., so that the plastic matter can be formed into continuous bands of suitable length. The bearings in which the ends of the roller A are hung can be adjusted vertically by means of screws that carry at their upper ends toothed wheels *c* and *c'*, which both mesh into a pinion, *b*, the case of which carries a hand-wheel, *a*, so that by turning the hand-wheel $a$ both bearings are simultaneously and equally adjusted. The bearings of the roller E are adjusted vertically by suitable screws, $d$. The main driving-shaft of the machine is shown at $f$, and carries at its ends loose and fast pulleys $e$ and $e'$. The other end of the shaft $f$ has a pinion which gears into toothed wheels $g$ $g'$, that are mounted on the shafts B and F, respectively. The other end of the shaft B carries a pinion, $h$, which by intermediate pinions, $i$ and $k$, engages with a pinion, $l$, that is mounted upon the shaft A. (See dotted rings in Fig. 4.) The wheels $h$ and $l$ are detachable, so that if figure-rollers of different sizes are successively used on the machine a corresponding change in the sizes of the toothed rollers $h$ and $l$ may be made.

The motion of the roller F may be transferred, if desired, to the roller E by pinions $m$ $n$, as shown, although this transfer of motion will sufficiently be produced by the intermediate plate, D.

I claim—

1. The combination of the figured roller A and counter-roller B with the traveling bed D, and rollers E F, said bed passing below the rollers A E and above the rollers B F, and with the conduit C, which is placed to discharge the plastic matter upon the bed D, between the two sets of rollers A B and E F, substantially as herein shown and described.

2. The combination of the figured roller A, having cutting-edges $o$ and grooves $p$, with the traveling bed D, substantially as described.

In testimony whereof I have signed my name to this specification in the presence of two subscribing witnesses.

JOSEF REDELIGX.

Witnesses:
C. KURTZ,
TH. PEITMANN.